United States Patent
Chen (10) Patent No.: US 9,686,753 B2
(45) Date of Patent: Jun. 20, 2017

(54) BASE STATION, TERMINAL, AND POWER CONTROL METHODS THEREOF

(71) Applicant: ZTE Corporation, Shenzhen, Guangdong (CN)

(72) Inventor: Kanhao Chen, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 0 days.

(21) Appl. No.: 14/425,008

(22) PCT Filed: Aug. 28, 2013

(86) PCT No.: PCT/CN2013/082458
§ 371 (c)(1),
(2) Date: Mar. 18, 2015

(87) PCT Pub. No.: WO2014/036905
PCT Pub. Date: Mar. 13, 2014

(65) Prior Publication Data
US 2015/0230189 A1 Aug. 13, 2015

(30) Foreign Application Priority Data
Sep. 4, 2012 (CN) .......................... 2012 1 0323129

(51) Int. Cl.
*H04B 7/00* (2006.01)
*H04W 52/24* (2009.01)
(Continued)

(52) U.S. Cl.
CPC ........... *H04W 52/243* (2013.01); *H04L 5/005* (2013.01); *H04W 16/28* (2013.01); *H04W 24/02* (2013.01);
(Continued)

(58) Field of Classification Search
CPC . H04W 52/243; H04W 52/245; H04W 16/28; H04W 88/08; H04L 5/005
(Continued)

(56) References Cited

U.S. PATENT DOCUMENTS 6,473,616 B1 * 10/2002 Sydor .................... H01Q 1/246
455/25
2004/0242161 A1 * 12/2004 Marinier .............. H04B 17/309
455/67.13
(Continued)

FOREIGN PATENT DOCUMENTS

CN 102281571 A 12/2011
CN 102484796 A 5/2012
(Continued)

OTHER PUBLICATIONS

Supplementary European Search Report in European application No. 13834862.8, mailed on Jan. 4, 2016.
(Continued)

*Primary Examiner* — Md Talukder
(74) *Attorney, Agent, or Firm* — Oppedahl Patent Law Firm LLC (57) ABSTRACT

Disclosed are a base station, a terminal and power control methods thereof, and the power control method for a base station, when the base station transmits information to a user terminal, includes: a first transmission power at which the data information is transmitted to the user terminal is acquired; a first strength of data interference on a terminal attributed to a neighboring base station is determined based on the first transmission power; it is determined whether a difference value between the first strength of the data interference and an interference threshold is larger than 0 to acquire a determination result; and if the determination result is larger than 0, the first transmission power is lowered to a second transmission power so that when the data
(Continued)

information is transmitted at the second transmission power, a second strength of the data interference on the terminal attributed to the neighboring base station does not exceed the interference threshold, thereby solving the technical problem in the prior art that there is too excessive interference on other terminals when a base station transmits data signals.

10 Claims, 4 Drawing Sheets (51) Int. Cl.
    *H04W 24/02*     (2009.01)
    *H04L 5/00*     (2006.01)
    *H04W 16/28*     (2009.01)
    *H04W 24/10*     (2009.01)
    *H04W 88/02*     (2009.01)
    *H04W 88/08*     (2009.01)

(52) U.S. Cl.
    CPC ....... *H04W 52/244* (2013.01); *H04W 52/245* (2013.01); *H04W 24/10* (2013.01); *H04W 88/02* (2013.01); *H04W 88/08* (2013.01)

(58) Field of Classification Search
    USPC ............................ 455/522, 67.13, 422.1, 450
    See application file for complete search history.

(56) References Cited

U.S. PATENT DOCUMENTS

| | | | |
|---|---|---|---|
| 2006/0019694 A1 | 1/2006 | Sutivong | |
| 2008/0159196 A1* | 7/2008 | Roh | H04W 52/245 370/311 |
| 2008/0214121 A1* | 9/2008 | Sutivong | H04L 1/0045 455/67.13 |
| 2009/0023466 A1* | 1/2009 | Sutivong | H04L 1/0045 455/522 |
| 2009/0041002 A1 | 2/2009 | Marinier | |
| 2011/0070919 A1 | 3/2011 | Komine | |
| 2011/0136533 A1* | 6/2011 | Senarath | H04W 52/146 455/522 |
| 2011/0195730 A1 | 8/2011 | Chami | |
| 2011/0235598 A1* | 9/2011 | Hilborn | H04W 52/143 370/329 |
| 2012/0142364 A1* | 6/2012 | Duan | H04W 72/082 455/450 |
| 2012/0213092 A1 | 8/2012 | Sun | |
| 2012/0231832 A1 | 9/2012 | Marinier | |
| 2013/0114659 A1* | 5/2013 | Murakami | H04L 27/2691 375/224 |
| 2015/0124661 A1* | 5/2015 | He | H04L 5/0066 370/278 |
| 2015/0181501 A1* | 6/2015 | Soga | H04W 40/16 370/252 |
| 2015/0230189 A1* | 8/2015 | Chen | H04W 52/244 455/522 |

FOREIGN PATENT DOCUMENTS

| | | |
|---|---|---|
| CN | 102858004 A | 1/2013 |
| EP | 2469910 A1 | 6/2012 |
| WO | 2004082154 A2 | 9/2004 |
| WO | 2006007318 A1 | 1/2006 |
| WO | 2010006909 A1 | 1/2010 |
| WO | 2010013055 A1 | 2/2010 |

OTHER PUBLICATIONS

Supplementary European Search Report in European application No. 13834862.8, mailed on Sep. 25, 2015.
International Search Report in international application No. PCT/CN2013/082458, mailed on Nov. 21, 2013.
English Translation of the Written Opinion of the International Search Authority in international application No. PCT/CN2013/082458, mailed on Nov. 21, 2013.

* cited by examiner

BASE STATION, TERMINAL, AND POWER CONTROL METHODS THEREOF

TECHNICAL FIELD

The present disclosure relates to the field of wireless communications, and in particular to a base station, a terminal and power control methods thereof.

BACKGROUND

With the development of wireless communications, the coverage rate of wireless signals becomes increasingly important, and the number of Base Stations (BS) of different operators and for different communication purposes increases constantly, thus the number of User Equipments (UE) also increases constantly.

In the prior art, when transmitting data signals to a user terminal, a base station sets, according to its coverage range, a transmission power at which the signals are transmitted, then the data transmission power is adjusted according to drive tests, feedbacks from the user terminal and the like.

During implementation of technical solutions of the embodiment of the present disclosure, the applicant finds that in the prior art there is a problem below: when a base station transmits data signals to a user terminal, only a coverage range of the base station per se and feedbacks from the user terminal are taken into consideration during a determination of the base station's transmission power at which the data signals are transmitted, thus the transmission power of the base station is generally high, and high power data signals may then produce strong interference on terminals attributed to a neighboring base station around the base station, thereby resulting in a decrease in communication quality of the terminals of the neighboring base station or even incapability of normal communication.

SUMMARY

In view of the above, the embodiment of the present disclosure is intended to provide a base station, a terminal and power control methods thereof, which can reduce a strength of data interference from a base station on a terminal attributed to its neighboring base station.

To this end, the technical solutions of embodiments of the present disclosure are implemented as follows.

The embodiment of the present disclosure provides a power control method of a base station for use in the base station, when the base station transmits information to a user terminal, the method includes:

a first transmission power at which the data information is transmitted to the user terminal is acquired;

a first strength of data interference on a terminal attributed to a neighboring base station is determined based on the first transmission power;

it is determined whether a difference value between the first strength of the data interference and an interference threshold is larger than 0 to acquire a determination result; and if the determination result is larger than 0, the first transmission power is lowered to a second transmission power so that when the data information is transmitted at the second transmission power, a second strength of the data interference on the terminal attributed to the neighboring base station does not exceed the interference threshold.

Furthermore, the embodiment of the present disclosure further provides a power control method of a terminal for use in the terminal, when the terminal transmits data information to an operative base station, the method includes:

access signal strength information is received from the operative base station;

a first spatial loss when the data information is transmitted to the operative base station is acquired;

a first transmission power at which the data information is transmitted to the operative base station is determined based on the first spatial loss and an access signal strength in the access signal strength information;

a second spatial isolation between the terminal and a neighboring base station of the operative base station is acquired;

a strength of data interference on the neighboring base station is acquired according to the second spatial isolation and the first transmission power;

it is determined whether a difference value between the strength of the data interference and an interference threshold is larger than 0 to acquire a determination result; and if the determination result is larger than 0, the first transmission power is lowered to a second transmission power so that when the data information is transmitted at the second transmission power, a second strength of the data interference on the neighboring base station does not exceed the interference threshold.

The embodiment of the present disclosure further provides a base station, and the base station includes:

a first transmission unit configured to transmit a first pilot signal to a user terminal;

a first reception unit configured to receive a feedback signal transmitted from the user terminal in response to the first pilot signal; and a first processing chip, connected with the first transmission unit and the first reception unit, configured to: acquire, based on the first pilot signal and the feedback signal, a noise floor of data information to be received by the user terminal and a first spatial loss when the data information is transmitted to the user terminal; determine, based on the noise floor and the first spatial loss, a first transmission power at which the data information is transmitted to the user terminal; determine, based on the first transmission power, a first strength of data interference on a terminal attributed to a neighboring base station; determine whether a difference value between the first strength of the data interference and an interference threshold is larger than 0 to acquire a determination result; and if the determination result is larger than 0, lower the first transmission power to a second transmission power so that when the data information is transmitted at the second transmission power, a second strength of the data interference on the terminal attributed to the neighboring base station does not exceed the interference threshold.

The embodiment of the present disclosure further provides a user terminal, and the user terminal includes:

a second reception unit configured to receive access signal strength information transmitted from an operative base station and a first spatial loss when data information is transmitted to the operative base station;

a second processing chip, connected with the second reception unit, configured to: determine, according to the first spatial loss and a access signal strength in the access signal strength information, a first transmission power at which the data information is transmitted to the operative base station; acquire, according to a third spatial isolation between the user terminal and a neighboring base station of the operative base station and the first transmission power, a strength of data interference on the neighboring base station of the operative base station; determine whether a difference value between the strength of the data interference and an interference threshold is larger than 0 to acquire a determination result; and if the determination result is larger than 0, lower the first transmission power to a second transmission power so that when the data information is transmitted at the second transmission power, a second strength of the data interference on the neighboring base station of the operative base station does not exceed the interference threshold.

a second transmission unit, connected with the second processing chip, configured to transmit the data information to the operative base station at the second transmission power.

One or more technical solutions above according to the embodiment of the present disclosure have one or technical effects blow:

1. in the embodiment of the present disclosure, when transmitting data information to a user terminal, through determining a first transmission power, a base station acquires a strength of data interference of the base station on a terminal attributed to its neighboring base station when the data information is transmitted at the first transmission power, the transmission power of the base station is reduced according to an allowable maximum interference threshold, thus solving the technical problem in the prior art that the interference of the base station on the terminal attributed to its neighboring base station causes the terminal not to be able to normally receive data signals, and improving quality of downlink communications between the neighboring base station and the terminal attributed to the neighboring base station.

2. When transmitting data information to a base station, the user terminal adjusts its own transmission power not only taking into account a requirement of a base station to which the user terminal is attributed but also according to an interference threshold of a neighboring base station of the base station, if a first transmission power of the user terminal has too much interference on the neighboring base station, the transmission power of the user terminal per se will be lowered to reduce the interference on the neighboring base station, this solves the technical problem in the prior art that the interference is too high, and the neighboring base station is enabled to receive stronger data information transmitted from its terminal, thereby improving quality of uplink communications between the neighboring base station and its terminal.

DETAILED DESCRIPTION

In order to make the technical solutions of the present disclosure better understood, the technical solutions will be elaborated below with reference to the accompanying drawings and specific embodiments in which indoor base stations and terminals are taken as examples. It will be apparent for those skilled in the art that the power control method is not limited to applications such as indoor base stations and terminal, it can also be applied to pico base stations and micro base stations, and all other base stations and terminals that can be conceived by those skilled in the art based on the indoor base stations and terminals mentioned in the present disclosure fall within the scope of protection of the present disclosure.

The general idea of the present disclosure is as follows.

When transmitting data information to a user terminal to perform downlink communications, a base station first determines a maximum first transmission power at which the base station transmits data information to the user terminal according to relevant parameter information such as a spatial loss acquired from drive tests and a noise floor when the user terminal receives the data information; then the base station acquires an azimuth and a spatial isolation between the base station per se and a terminal attributed to a neighboring base station around the base station, and acquires, based on the first transmission power determined in the first step, a strength of data interference on the terminal attributed to the neighboring base station when the data information is transmitted at the first transmission power; then it is determined that whether the strength of the data interference exceeds an interference threshold, if it is indicated that the transmitting data information at the first transmission power results in a deterioration in quality of downlink communication between the neighboring base station and its terminal or even results in an incapability of normal communication, the base station will lower its practical transmission power, thereby reducing the interference on downlink communications between the neighboring base station and the terminal attributed to the neighboring base station and improving quality of the downlink communications between the neighboring base station and the terminal attributed to the neighboring base station.

When transmitting data information to an operative base station to perform uplink communications, the user terminal determines a maximum transmission power based on an idea as same as that in the downlink communication case, acquires, based on the maximum transmission power, a strength of data interference on a neighboring base station of the base station when the user terminal transmits the data information at the maximum transmission power, then determines whether the strength of the data interference exceeds a maximum tolerance of the neighboring base station namely an interference threshold, if it exceeds the interference threshold, the user terminal will adjust its practical transmission power so as to reduce the interference on uplink communications between the neighboring base station and its terminal and improve quality of the uplink communications between the neighboring base station and its terminal.

Main implementation principles, specific embodiments and beneficial results that can be achieved of the technical solutions according to the present disclosure will be elaborated with reference to the drawings.

Embodiment 1

Figure 1:
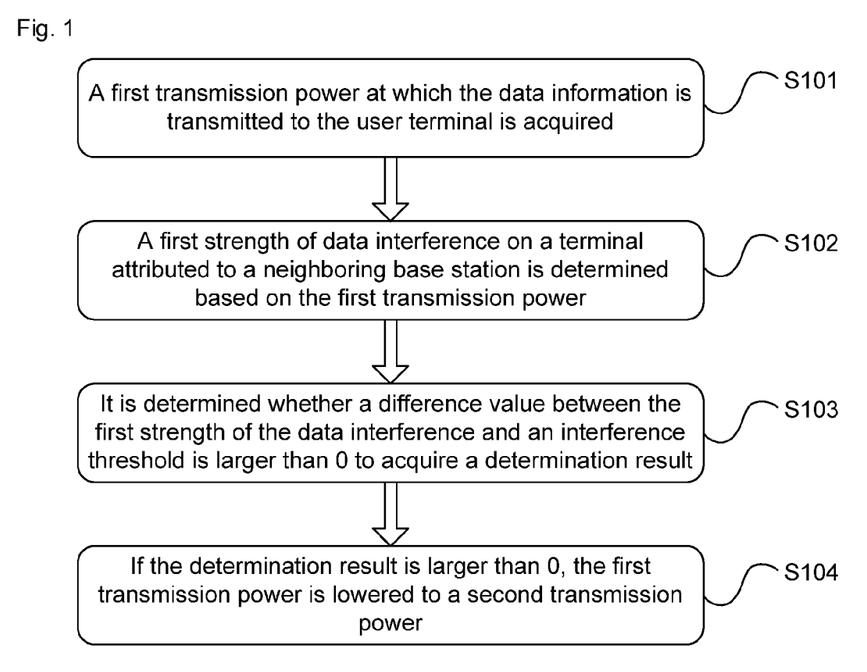
FIG. 1 is a power control flow chart of a base station per se according to a first embodiment of the present disclosure.

Referring to FIG. 1, embodiment 1 of the present disclosure provides a power control method of a base station for use in the base station, when the base station transmits information to a user terminal, the method includes:

S101, a first transmission power at which the data information is transmitted to the user terminal is acquired;

S102, a first strength of data interference on a terminal attributed to a neighboring base station is determined based on the first transmission power;

S103, it is determined whether a difference value between the first strength of the data interference and an interference threshold is larger than 0 to acquire a determination result; and S104, if the determination result is larger than 0, the first transmission power is lowered to a second transmission power so that when the data information is transmitted at the second transmission power, a second strength of the data interference on the terminal attributed to the neighboring base station does not exceed the interference threshold.

During a practical implementation, in order to acquire the first transmission power at which data information is transmitted to the user terminal in S101, the base station typically needs to transmit a pilot signal for performing a drive test and trial communications so as to detect a first spatial loss between the base station per se and a user terminal to be communicated with and a noise floor when the user terminal receives the data information.

In most of the time wireless communications are performed between a base station and a user terminal, and radio waves may encounter obstacles during propagation, such as cabinets, desks, hanging items and the like in cases of indoor communications and buildings, mountains, jungle and the like in cases of outdoor macro base station communications, all of which obstacles will decrease transmission capabilities of the waves and produce losses, even the air will impede transmission capabilities of the waves and then produce losses, therefore if the base station transmits data signals at a power of 10 W, due to the spatial loss the user terminal will typically receive the data signals at a power lower than 10 W, for example 9.5 W, 8 W or even 6 W; electronic devices of the user terminal may produce some noises namely noise floor when receiving the data signals, this will add further loss to the data signals transmitted from the base station, thus by the acquisition of the first spatial loss and the noise floor of the user terminal through transmission of the first pilot signal, it is possible to assist effectively the base station to analyze its communication environment, thereby improving accuracy of the determination of the first transmission power.

After the first transmission power is acquired in S101, S102 is implemented, in which a first strength of data interference on a terminal attributed to a neighboring base station is determined based on the first transmission power.

There are more and more base stations and their distribution becomes increasingly dense, particularly, interference between an indoor base station and a terminal attributed to a neighboring base station of the indoor base station becomes increasingly strong or even exceeds an interference threshold, which inevitably results in a deterioration of the whole communication environment, therefore the base station according to the embodiment of the present disclosure will determine a first strength of data interference between the base station per se and a terminal attributed to its neighboring base station so as to determine its effect on the whole communication system.

After completion of S102, S103 is implemented, in which it is determined whether a difference value between the first strength of the data interference and an interference threshold is larger than 0 to acquire a determination result.

During a practical implementation, the number of terminal i attributed to the neighboring base station of the base station may be more than one, respective interference strengths $I^{UE}_i$ are compared to work out a maximum one $I^{UE}_{iMAX}$, then a difference $(I^{UE}_{iMAX} - I^{UE}_{MAX})$ between the maximum one and a maximum allowable interference threshold $I^{UE}_{MAX}$ of the terminal i is calculated, and specific determination results include:

case 1: the determination result is no, i.e., $(I^{UE}_{iMAX} - I^{UE}_{MAX}) \leq 0$ or there is not a terminal i attributed to the neighboring base station, it is indicated that transmitting the data signals at the first transmission power $P_{DMAXj}$ does not affect normal communications of the terminal i, then the practical transmission power of the base station to the user terminal j is $P_{Dj} = P_{DMAXj}$; and case 2: the determination result is yes, i.e., $I^{UE}_{iMAX} - I^{UE}_{MAX} > 0$, it is indicated that transmitting the data signals at the first transmission power $P_{DMAXj}$ affects normal communications of the terminal i. In order to ensure the normal communications of the terminal i, the embodiment of the present disclosure reduces the strength of data interference of the base station on the terminal i attributed to its neighboring base station so as to quality of communications between the neighboring base station and the terminal i attributed to the neighboring base station. In order to reduce data interference of the base station on a terminal i attributed to its neighboring base station, S104 is implemented.

S104, if the determination result is larger than 0, lowering the first transmission power to a second transmission power so that when the data information is transmitted at the second transmission power, a second strength of the data interference on the terminal attributed to the neighboring base station does not exceed the interference threshold.

During a practical implementation, before the first transmission power is lowered to a second transmission power, after receiving a feedback signal responded from the user terminal, the base station acquires, based on the feedback information, parameter information for determining the second transmission power.

The parameter information specifically includes: a beam forming gain $G_{BFj}$ when signals are transmitted, a noise floor $NI_j$ of data information to be received by the user terminal, a first spatial loss $PL_j$ when the data information is transmitted to the user terminal, and a demodulation threshold $SNR_{Dh}$ of a highest order modulation when the data information is transmitted to the user terminal. Based on the parameter information and a difference value $(I^{UE}_{iMAX} - I^{UE}_{MAX})$ between the first strength of the data interference and the interference threshold, it can be determined that the second transmission power at which the data information is transmitted to the user terminal namely a current practical transmission power of the operative base station with respect to the user terminal j, i.e., the second transmission power $P_{Dj}$ can be obtained from the following equation:

$$P_{Dj} = NI_j + SNR_{Dh} - G_{BFj} + PL_j - ((I^{UE}_{iMAX} - I^{UE}_{MAX})$$

The maximum first transmission power of the base station is $P_{DMAXj} = NI_j + SNR_{Dh} - G_{BFj} + PL_j$, thus the second transmission power can also be:

$$P_{Dj} = P_{DMAXj} - (I^{UE}_{iMAX} - I^{UE}_{MAX}).$$

In the case that a requirement of the terminal j on a strength of data information to be received is met, the second transmission power is not limited to being reduced by $(I^{UE}_{iMAX}-I^{UE}_{MAX})$, it can also be reduced by a value larger than $(I^{UE}_{iMAX}-I^{UE}_{MAX})$. It is assumed that the requirement of the terminal j on the strength of data information to be received is no less than 30 W, a first transmission power of the base station is 45 W, and when data signals are transmitted at 45 W, the interference threshold is exceeded by 5 W, then the second transmission power can be lowered to any value between 30 W and 40 W.

Figure 2:
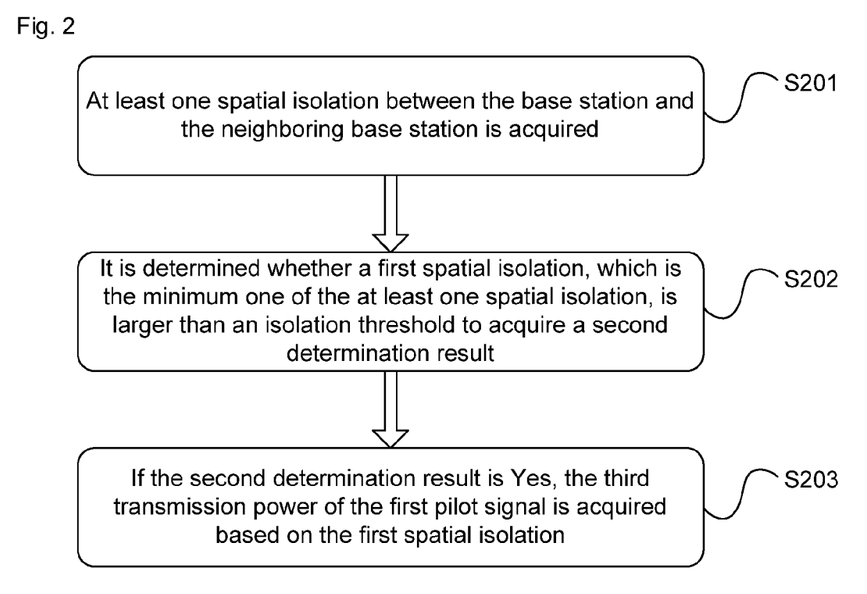
FIG. 2 is a flow chart for determining transmission power of a pilot signal according to a first embodiment of the present disclosure.

During the implementation of the present disclosure, in order to reduce interference to the most extent when a first pilot signal is transmitted, it is desired to first determine a third transmission power of the first pilot signal, as shown in FIG. 2, the embodiment of the present disclosure provides a method for determining the third transmission power of the first pilot signal, and the method includes:

S201, at least one spatial isolation between the base station and the neighboring base station is acquired;

S202, it is determined whether a first spatial isolation, which is the minimum one of the at least one spatial isolation, is larger than an isolation threshold to acquire a second determination result;

S203, if the second determination result is Yes, the third transmission power of the first pilot signal is acquired based on the first spatial isolation.

The specific implementation of S201 is elaborated as follows.

Firstly, the base station listens to a neighboring base station around itself, and a pilot signal strength $R^{BS}_i$, in order to calculate RBS accurately, interference is desired to be taken into account, and the method is: it is assumed that the energy of received pilot signal k transmitted from a same antenna is $R^{polit}_k = R^{BS}_k + N_k$, wherein $R^{BS}_k$ is the energy of a pure pilot signal k, $N_k$ is interference superposed on the pilot signal k, the true value of pilot signal k is $P_k$, then from equation:

$$R^{BS} = \frac{1}{N}\left|\sum_k^N (R^{polit}_k \cdot P_k)\right| = \frac{1}{N}\left|\sum_k^N (R^{polit}_k \cdot P_k)\right|$$

the strength RBSi of the pure pilot signal of the neighboring base station i can be obtained, since the interference superposed on K goes to 0 after being correlatedly summed with pilot true value.

Then, the pilot transmission power $T^{BS}_i$ of the neighboring base station is monitored, since certain loss may be produced due to a distance between the base station and its neighboring base station, the pilot transmission power of the neighboring base station is typically larger than the pilot signal strength $R^{BS}_i$ practically acquired through monitoring, then a spatial isolation $PL^{BS-BS}_i$ between the operative base station and its neighboring base station is calculated and obtained:

$$PL^{BS-BS}_i = T^{BS}_i - R^{BS}_i$$

Since the base station may not have a neighboring base station around itself, or there may be one or more neighboring base station, when there is no neighboring base station around the base station, the spatial isolation is infinite, then a first spatial isolation $PL^{BS-BS}_{iMIN}$ is determined, since the larger the spatial isolation between the base station and its neighboring base station, the smaller the interference therebetween, if the minimum spatial isolation is larger than an allowable minimum isolation namely iso-lation threshold, spatial isolations of all of the neighboring base station are larger than the isolation threshold.

The whole step S201 can be performed under the assistance of a core network to which the base station is attributed:

firstly, the core network controls idle base stations to enter successively an interference listening mode so as to avoid leak detection resulted from simultaneous entering of the interference listening mode.

Then, the core network can collect latitude and longitude, cell ID, operation frequency, pilot transmission power of in-network base stations, and according to latitudes and longitudes of respective base stations and network segments where they are located, when each of the respective base stations is accessed to the core network for the first time or initiates a query, the core network can broadcast, to a base station, cell IDs and pilot transmission power ($T^{BS}_i$) of base stations nearby the base station and having a same frequency, so as to shorten its listening time. After receiving the information, the base station can perform listening only on idle subframes of non-broadcast frames so that transmission of the base station's synchronization signals and broadcast frames will not be affected.

The core network can also collect pilot interference pilot interference warnings of respective base stations, neighboring base station ID, and a spatial isolation $PL^{BS-BS}_i$ between each of the respective base station and its neighboring base station. Then the core network can transmit the spatial isolation information $PL^{BS-BS}_i$ to the base station.

After the acquisition of the spatial isolation between the base station and its neighboring base station, step S202 is implemented, i.e., it is determined whether a first spatial isolation, which is the minimum one of the at least one spatial isolation, is larger than an isolation threshold to acquire a second determination result. Then there are two cases:

case 1: the determination result is yes, it is indicated that a first spatial isolation, which is the minimum one, is larger than the isolation threshold, and proceed to step S203: if the second determination result is Yes, the third transmission power of the first pilot signal is acquired based on the first spatial isolation, which is namely the base station's own pilot/broadcast transmission power $T^{BS}_0 = SNR_{RS} + PL^{BS-BS}_{iMIN}$, wherein $SNR^{RS}$ is a broadcast signal demodulation threshold;

case 2: the determination result is no, i.e., $PL^{BS-BS}_{iMIN}$ is smaller than the isolation threshold $PL^{BS-BS}_T$ or $R^{BS}_i$ and exceeds the threshold $R^{BS}_T$, it is indicated that the relatively large interference between the base station and its neighboring base station will result in a decrease in quality of communications on both sides. Then the base station may automatically issue a warning, which can be an acoustic/optical waring or a background warning, so that an HNB or antenna finds once more an appropriate locating position, as to an outdoor marco base station, it can change directions in which data signals are transmitted/received.

In order to find once more an appropriate base station locating position in a better way, interfering base stations can be sequenced according to pilot signal strength $\theta^{BS}_i$ of respective interfering base stations to acquire neighboring base stations of which the pilot signal strength exceeds the threshold, then directions of there base stations are measured to calculate a fourth azimuth $\theta^{BS}_i$ between the neighboring base stations of which the pilot signal strength exceeds the threshold and the operative base station.

Figure 3:
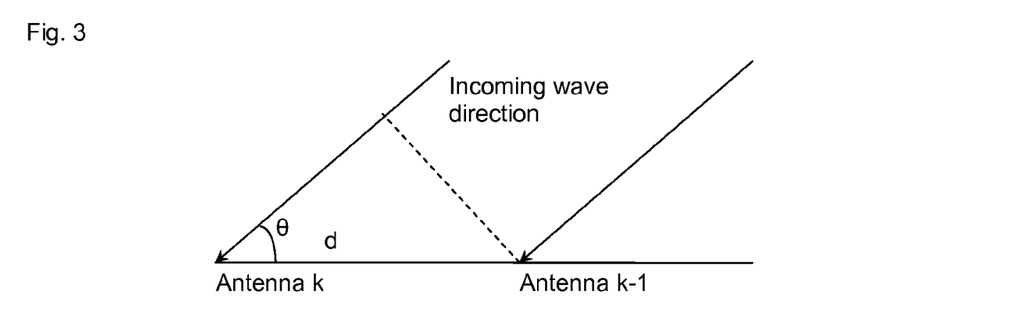
FIG. 3 is a schematic diagram of a linear antenna array according to a first embodiment of the present disclosure.
Figure 4:
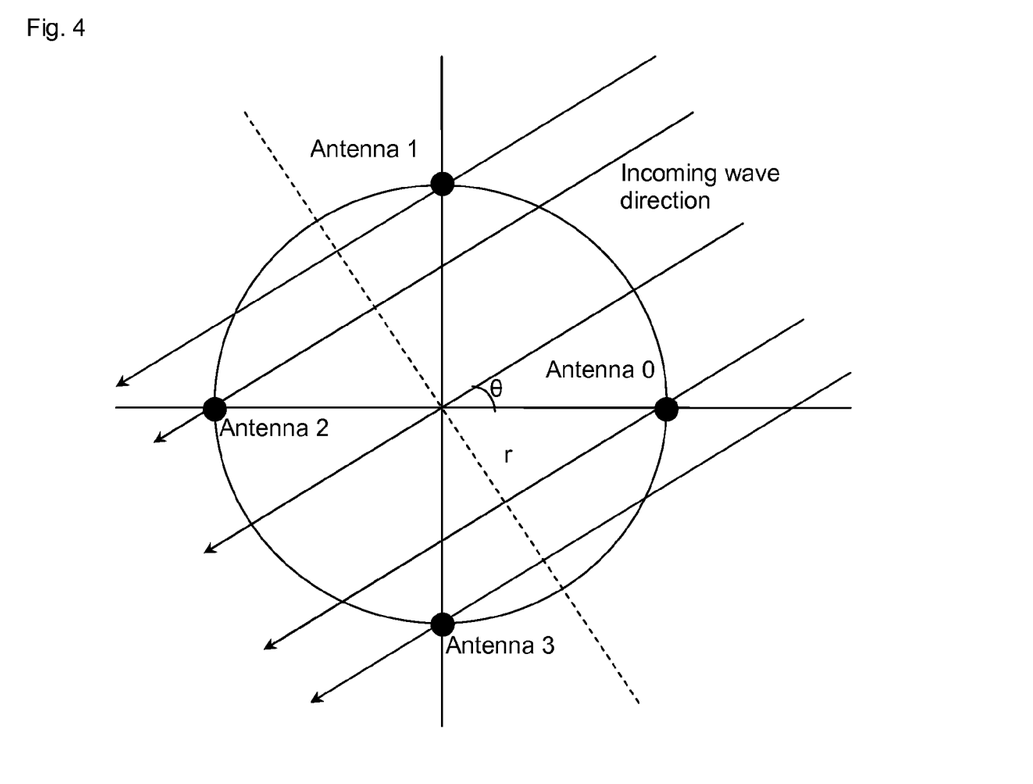
FIG. 4 is a schematic diagram of a circular antenna array according to a first embodiment of the present disclosure.

The method for calculating the azimuth is as follows. It is assumed that an antenna k receives a signal $A_k \exp(\phi_k)$ from its neighboring base station, wherein A is the amplitude of the signal and is the signal phase. Since antennas of a base station can be arranged as a linear antenna array and a circular antenna array and the two antenna array have different azimuth calculation methods, thus methods thereof will be described respectively below:

1. as to the linear antenna array, referring to FIG. 3, according to incoming wave directions of signals, it can be learned that there is a relation:

$$2\pi \frac{d \cdot \cos(\theta^{BS})}{\lambda} = \varphi_k - \varphi_{k-1}$$

wherein d is a distance between antenna k and antenna k−1, λ is a signal wavelength, thus the fourth azimuth $\theta^{BS}_i$ of the neighboring base station i is:

$$\theta^{BS}_i = \arccos\left(\frac{\varphi_k - \varphi_{k-1}}{2\pi} \cdot \frac{\lambda}{d}\right)$$

2. as to the circular antenna array, referring to FIG. 4, wherein r is a radius of the circular array, phase relations between antenna 0, antenna 1, antenna 2 and antenna 3 are:

$$2\pi \cdot \frac{r\sin\theta - r\cos\theta}{\lambda} = \varphi_1 - \varphi_0$$

$$2\pi \cdot \frac{r\sin\theta - r\cos\theta}{\lambda} = \varphi_2 - \varphi_1$$

$$2\pi \cdot \frac{r\sin\theta - r\cos\theta}{\lambda} = \varphi_3 - \varphi_2$$

$$2\pi \cdot \frac{r\sin\theta - r\cos\theta}{\lambda} = \varphi_0 - \varphi_3$$

thus the fourth azimuth ($\theta^{BS}_i$) of the neighboring base station i:

$$\theta^{BS}_i = \arccos\left(\frac{\varphi_0 - \varphi_2}{4\pi} \cdot \frac{\lambda}{r}\right)$$

$$= \arccos\left(\frac{\varphi_1 - \varphi_3}{4\pi} \cdot \frac{\lambda}{r}\right)$$

$$= \frac{1}{2}\left[\arccos\left(\frac{\varphi_0 - \varphi_2}{4\pi} \cdot \frac{\lambda}{r}\right) + \arccos\left(\frac{\varphi_1 - \varphi_3}{4\pi} \cdot \frac{\lambda}{r}\right)\right]$$

After the fourth azimuth $\theta^{BS}_i$ between the neighboring base station of which the pilot signal strength exceeds the threshold and the operative base station is obtained through above method, the position of the base station or a antenna can be moved along a reverse direction of the fourth azimuth $\theta^{BS}_i$ or along other directions, so as to reduce the interactive interference between the base station and its neighboring base station. After the position is re-determined, steps S201 and S202 are re-implemented until the first spatial isolation is larger than the isolation threshold, then step S203 is implemented to acquire the third transmission power of the first pilot signal.

During a specific implementation, after the determination of the third transmission power of the first pilot signal, the base station then transmits the first pilot signal at the third transmission power to the user terminal; a feedback signal transmitted from the user terminal in response to the first pilot signal is then received; and then the base station can acquire the first transmission power according to the feedback signal.

The specific method for the base station to acquire the first transmission power is: acquiring received first pilot signal strength $RSRP_j$ and pilot signal quality $RSRQ_j$ fed back by the user terminal j, which are included in the feedback signal. According to the first pilot signal strength $RSRP_j$ and the pilot signal quality $RSRQ_j$, a noise floor NIj of the user terminal j and $PL_j$ between the base station and the user terminal j are acquired through the following equations:

$$NI_j = RSRP_j - RSRQ_j$$

$$PL_j = T^{BS}_0 - RSRP_j$$

Then according to $NI_j$, $PL_j$, a demodulation threshold $SNR_{Dh}$ of a downlink highest order modulation when the data information is transmitted to the user terminal and beam forming gain $G_{BFj}$, a maximum traffic first transmission power of the base station with respect to the user terminal j $$P_{DMAXj} = NI_j + SNR_{Dh} - G_{BFj} + PL_j.$$

During a practical implementation, a first strength of data interference on a terminal attributed to a neighboring base station is determined based on the first transmission power, and the specific method includes:

firstly, a first azimuth $\theta^{UE}_j$ of beam forming between the base station and the user terminal and a second azimuth $\theta^{UE}_i$ between the base station and the terminal i attributed to the neighboring base station are acquired, methods for acquiring the first azimuth and the second azimuth are the same as above method for acquiring the fourth azimuth $\theta^{BS}_i$ of the neighboring base station, thus the detailed description thereof will be omitted herein.

a third azimuth ($\theta^{UE}_i - \theta^{UE}_j$) of the terminal i attributed to the neighboring base station, deviating from a direction of the beam forming is acquired based on the first azimuth $\theta^{UE}_j$ and the second azimuth $\theta^{UE}_i$. Since beam forming techniques are used in the embodiment of the present disclosure, through superposition of phases of signals transmitted from multiple antennas, phases of signals are superposed in the direction of the first azimuth, thus gain of the signals are accomplished; and the phases of the signals are offset in other directions, thus interference on other terminals are reduced, therefore the signals have relatively great loss in a third azimuth ($\theta^{UE}_i - \theta^{UE}_j$) having a direction deviating from the beam forming direction.

Then, according to an azimuth radiation pattern, the first radiation loss ($\theta^{UE}_i - \theta^{UE}_j$) in the third azimuth ($\theta^{UE}_i - \theta^{UE}_j$) having a direction deviating from the beam forming direction is acquired. In order to determine accurately the strength of data interference, when the strength of data interference is calculated, the embodiment of the present disclosure not only takes into account the second spatial isolation $PL^{BS-UE}_i$ between the base station and the terminal i attributed to its neighboring base station, but also takes into account different losses in different directions deviating from the beam forming direction, thus the strength of data interference is accurately calculated according to different radiation losses in different azimuths of the azimuth radiation pattern of beam forming.

Finally, the first strength of the data interference on the terminal i attributed to the neighboring base station when the data information is transmitted at the first transmission power $P_{DMAXj}$ is acquired based on the first transmission power $P_{DMAXj}$ and the first radiation loss ($\theta^{UE}_i - \theta^{UE}_j$).

$$I^{UE}_i = P_{DMAXj} + G_{BFj} - L(\theta UE_i - \theta UE_j) - PL^{BS-UE}_i$$

The strength $I^{UE}_i$ of data interference can also be acquired under the assistance of a core network: firstly the base station transmits a probe signal at the first transmission power, then a strength of first data interference, on the terminal attributed to the neighboring base station, transmitted based on the probe signal from a core network to which the base station is attributed is received. Since if a terminal i attributed to the neighboring base station is subjected to interference exceeding the maximum allowable interference threshold $I^{UE}_{MAX}$, a cell ID of the base station interfering the terminal i and an interference signal strength $I^{UE}_i$ can be reported to the core network by a base station to which the terminal is attributed, and after receiving the waring, the core network reports to a base station to which the cell is attributed of the interference signal strength $I^{UE}_i$.

In the above embodiment, since the base station lowers the practical transmission power of data signals, thus reduces data interference on the terminal i, so that quality of communications between the neighboring base station and its attributed terminal i is improved; and since the transmission power of the base station is reduced, beneficial effect of saving of electricity can be achieved; furthermore, in the embodiment of the present disclosure beam forming techniques are used when the bases station transmits signals, higher beam forming gains can be achieved in the beam forming direction, data signals having higher power can be received by the user terminal, thereby improving data traffic and thus improving communication quality.

Embodiment 2

Figure 5:
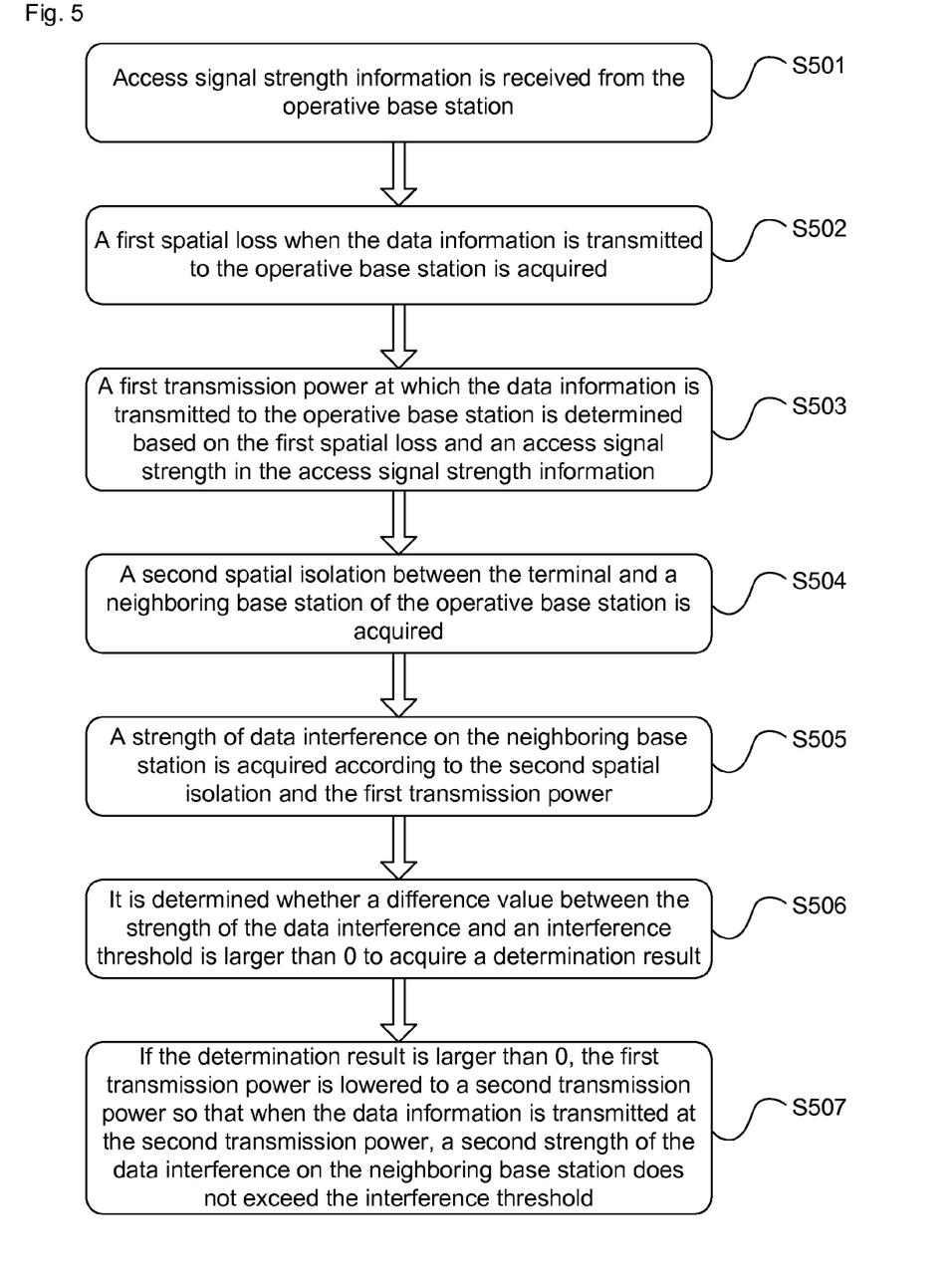
FIG. 5 is a power control flow chart of a terminal assisted by a core network according to a second embodiment of the present disclosure.

Referring to FIG. 5, the embodiment of the present disclosure provides a power control method of a terminal for use in the terminal, when the terminal transmits data information to an operative base station, the method includes:

S501, access signal strength information is received from the operative base station.

Wherein an access signal strength $R_{AT}$ in the access signal strength information includes an access signal demodulation threshold $SNR_{AT}$ of the operative base station and a noise floor $NI_{BS}$ of the operative base station measured by the base station per se, and $R_{AT}=SNR_{AT}+NI_{BS}$.

Generally, when the user terminal desires to transmit data information to the operative bases station, a communication request is transmitted, and when receiving the communication request, the operative base station transmits its own access signal strength information to the user terminal; or through directly listening to an access signal strength request signal broadcasted by the operative base station per se, the user terminal receives the access signal strength information of the base station.

S502, a first spatial loss when the data information is transmitted to the operative base station is acquired.

During a practical implementation, after a communication connection is established between the user terminal and the operative base station, the operative base station transmits a pilot signal to the user terminal, and meanwhile broadcasts its own pilot signal transmission power $T^{BS}_0$, since there is loss during transmission of the signal, a practical pilot signal strength $RSRP_j$ received by the user terminal is lower than the pilot signal transmission power $T^{BS}_0$ of the base station. The user terminal acquires, according to a difference value between the $T^{BS}_0$ and practically received $RSRP_j$, the first spatial loss $PL_j=T^{BS}_0-RSRP_j$ when information is transmitted to the operative base station.

S503, a first transmission power at which the data information is transmitted to the operative base station is determined based on the first spatial loss and an access signal strength in the access signal strength information.

Since beam forming techniques are used in the embodiment of the present disclosure, when receiving data signals from the user terminal, the operative base station produces a reception combination gain $G_{RCj}$, the user terminal is not desired to ensure that the operative base station can readily receive data signals having high quality through transmitting data signals having very high powers. Generally, according to a demodulation threshold $SNR_{Uh}$ of an uplink highest order modulation when the data information is transmitted from the user terminal to the operative base station, reception combination gain $G_{RCj}$, a first spatial loss $PL_j$ and a noise floor $NI_{BS}$ of the base station acquired from the access signal strength, the user terminal j can determine a maximum first transmission power $P_{UMAXj}=NI_{BS}+SNR_{Uh}-G_{RCj}+PL_j$ at which data information is transmitted to the operative base station.

S504, a second spatial isolation between the terminal and a neighboring base station of the operative base station is acquired.

When the user terminal transmits data information to the operative base station, the signals transmitted from the user terminal produce data interference on the neighboring base station of the operative base station, in order to avoid too strong interference, in embodiment of the present disclosure the strength of the data interference is further determined through acquisition of the second spatial isolation between the user terminal j and the neighboring base station of the operative base station. The specific implementation can be:

the user terminal listens to a third pilot signal power $RSRP_{ji}$ of each neighboring base station, and calculates the second spatial isolation $PL^{UE-BS}_{ji}=T^{BS}_i-RSRP_{ji}$ between the user terminal j and each neighboring base station according to a received practical pilot transmission power $PL^{UE-BS}_{ji}=T^{BS}_i-RSRP_{ji}$ of each neighboring base station, which is listened by operative base station.

S505, a strength of data interference on the neighboring base station is acquired according to the second spatial isolation and the first transmission power.

Generally, the user terminal j can acquire, according to a difference value between the first transmission power $P_{UMAXj}$ and the second spatial isolation $PL^{UE-BS}_{ji}$, the strength $I^{BS}_{ji}=P_{UMAXj}-PL^{UE-BS}_{ji}$ of data interference on each neighboring base station.

During an implementation, the strength $I^{BS}_{ji}$ of data interference between the user terminal and the neighboring base station of the operative base station can also be coordinated using a core network.

If a neighboring base station is subjected to interference, exceeding the maximum allowable interference threshold $I^{BS}_{MAX}$, from the terminal j of the operative base station i, a cell ID of the base station i that interferes the neighboring base station, attributed terminal pilot and its interference signal strength $I^{BS}_{ji}$ can be reported to a core network. After receiving the warning, the core network reports to a base station i to which the cell ID is attributed of the interference pilot and its strength $I^{BS}_{ij}$ of data interference, and after the operative base station is notified, it transmits, to the user terminal, the strength $I^{BS}_{ji}$ of data interference exceeding the maximum interference threshold.

S506, it is determined whether a difference value between the strength of the data interference and an interference threshold is larger than 0 to acquire a determination result.

During a specific implementation, since there are typically multiple neighboring base stations for the operative base station, in order to ensure that the user terminal does not produce too strong interference on any of its neighboring base stations, the user terminal can compare respective interference strengths $I^{BS}_{ji}$, finds a maximum value $I^{BS}_{jiMAX}$, calculates a difference $I^{BS}_{jiMAX}-I^{BS}_{mA}$ between the maximum value and the maximum allowable interference threshold $I^{BS}_{MAX}$, and determines whether the difference between the strength $I^{BS}_{ji}$ of data interference and the interference threshold $I^{BS}_{MAX}$ is larger than 0 to acquire a determination result.

When the determination result is smaller than or equal to 0, i.e., $(I^{BS}_{jiMAX}-I^{BS}_{MAX}) \leq 0$ or there is no interfering bass station, it is indicated that no strong interference on the neighboring base station around the operative base station will be produced when the user terminal transmits data signals at the first transmission power, then the practical transmission power of the user terminal j is $P_{Uj}=P_{UMAXj}$.

When the determination result is larger than 0, i.e., $(I^{BS}_{jiMAX}-I^{BS}_{MAX})>0$, it is indicated that strong interference on the neighboring base station around the operative base station will be produced when the user terminal transmits data signals at the first transmission power, thereby resulting in deterioration of uplink communication environment between the neighboring base station and its terminals.

S507, if the determination result is larger than 0, the first transmission power is lowered to a second transmission power so that when the data information is transmitted at the second transmission power, a second strength of the data interference on the neighboring base station does not exceed the interference threshold. Practical transmission power of the user terminal j is lowered, thus the data interference on the neighboring base station is reduced.

In the embodiment of the present disclosure, in order to further determine the second transmission power, before lowering of the first transmission power to the second transmission power, the user terminal can acquire a reception combination gain $G_{RCj}$ when the operative base station receives data signals, and based on the reception combination gain $G_{RCj}$, the difference value $(I^{BS}_{jiMAX}-I^{BS}_{MAX})$ and the first transmission power $P_{UMAXj}$, the second transmission power at which data information is transmitted to the operative base station, i.e., the practical transmission power $P_{Uj}$ of the user terminal j can be determined from the following equation:

$$P_{Uj}=NI_{BS}+SNR_{Uh}-G_{RCj}+PL_j-(I^{BS}_{jiMAX}-I^{BS}_{MAX})$$

Since the first transmission power $P_{UMAXj}=NI_{BS}+SNR_{Uh}-G_{RCj}+PL_j$, the second transmission power can be:

$$P_{Uj}=P_{UMAXj}-(I^{BS}_{jiMAX}-I^{BS}_{MAX})$$

At the premise of ensuring normal communications between the user terminal and the operative base station, the second transmission power at which data signals are practically transmitted to the operative base station is not limited to subtracting from the first transmission power a difference value between the maximum strength of data interference and the maximum interference threshold, a value larger than the difference value can also be subtracted therefrom. It is assumed that a lowest strength of data signals transmitted from the user terminal to the operative base station is 40 W, the maximum first transmission power determined by the user terminal is 50 W, and a difference value between the maximum strength of data interference and the interference threshold is 5 W, then the second transmission power at which the data information is practically transmitted from the user terminal to the operative base station can be lowered to 45 W, and it can also be lowered to values between 40 W and 45 W such as 43 W or 42 W.

Since when data signals are transmitted from the user terminal to the base station, not only the requirement on the access signal strength of the base station is taken into account, but also data interference, resulted from data signals transmitted by the user terminal per se, on the base station is reduced, thereby solving the technical problem that the interference is too high, improving the whole communication environment and improving quality of uplink communications between the neighboring base station and its attributed terminals. Beam forming techniques are used in the embodiment of the present disclosure, thus the user terminal is enabled to reduce, according to the reception combination gain of the operative base station, the second transmission power at which data signals are practically transmitted.

Embodiment 3

Figure 6:
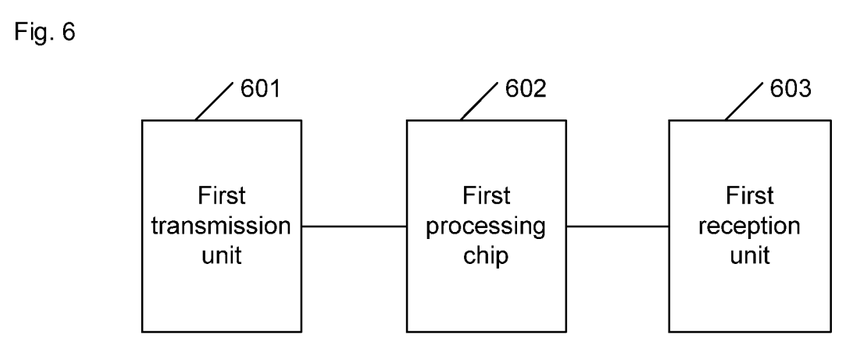
FIG. 6 is a structural diagram of a base station according to a third embodiment of the present disclosure.

Referring to FIG. 6, the embodiment of the present disclosure provides a base station, and the base station includes:

a first transmission unit 601 configured to transmit a first pilot signal to a user terminal;

a first reception unit 603 configured to receive a feedback signal transmitted from the user terminal in response to the first pilot signal; and a first processing chip 602, connected with the first transmission unit 601 and the first reception unit 603, configured to: acquire, based on the first pilot signal and the feedback signal, a noise floor of data information to be received by the user terminal and a first spatial loss when the data information is transmitted to the user terminal; determine, based on the noise floor and the first spatial loss, a first transmission power at which the data information is transmitted to the user terminal; determine, based on the first transmission power, a first strength of data interference on a terminal attributed to a neighboring base station; determine whether a difference value between the first strength of the data interference and an interference threshold is larger than 0 to acquire a determination result; and if the determination result is larger than 0, lower the first transmission power to a second transmission power so that when the data information is transmitted at the second transmission power, a second strength of the data interference on the terminal attributed to the neighboring base station does not exceed the interference threshold.

The above first transmission unit 601, first reception unit 603 and the first processing chip 602 can be implemented by a Central Processing Unit (CPU), a Digital Signal Processor or a Field-Programmable Gate Array in the base station.

Since the base station in the embodiment is a virtual device corresponding to the method, thus the detailed operation process thereof will be omitted.

Embodiment 4

Figure 7:
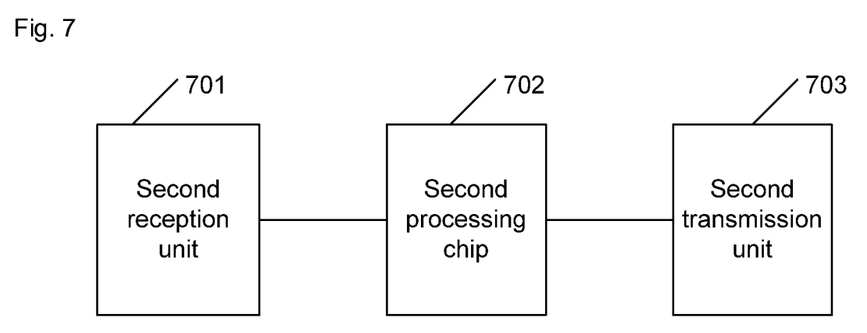
FIG. 7 is a structural diagram of a terminal according to a fourth embodiment of the present disclosure.

Referring to FIG. 7, a user terminal is shown, and the user terminal includes:

a second reception unit 701 configured to receive access signal strength information transmitted from an operative base station and a first spatial loss when data information is transmitted to the operative base station;

a second processing chip 702, connected with the second reception unit 701, configured to: determine, according to the first spatial loss and a access signal strength in the access signal strength information, a first transmission power at which the data information is transmitted to the operative base station; acquire, according to a third spatial isolation between the user terminal and a neighboring base station of the operative base station and the first transmission power, a strength of data interference on the neighboring base station of the operative base station; determine whether a difference value between the strength of the data interference and an interference threshold is larger than 0 to acquire a determination result; and if the determination result is larger than 0, lower the first transmission power to a second transmission power so that when the data information is transmitted at the second transmission power, a second strength of the data interference on the neighboring base station of the operative base station does not exceed the interference threshold; and a second transmission unit 703, connected with the second processing chip 702, configured to transmit the data information to the operative base station at the second transmission power.

The above second reception unit 701, second processing chi 702 and second transmission unit 703 can be implemented by a CPU, DSP or FPGA in the base station.

Since user terminal in the embodiment is a virtual device corresponding to the method, thus the detailed operation process thereof will be omitted.

One or more technical solutions above according to the embodiment of the present disclosure can achieve one or technical effects blow:

1. in the embodiment of the present disclosure, when transmitting data information to a user terminal, through determining a first transmission power, a base station acquires a strength of data interference of the base station on a terminal attributed to its neighboring base station when the data information is transmitted at the first transmission power, if the strength of the data interference exceeds an interference threshold, a practical transmission power of the base station is adjusted using beam-forming techniques so as to reduce the strength of the interference, thus solving the technical problem in the prior art that the base station has too excessive interference on the terminal attributed to its neighboring base station. Since the strength of the data interference is reduced, the terminal attributed to the neighboring base station is enabled to better receive data information from the neighboring base station, thereby improving quality of downlink communication between the neighboring base station and its terminal.

2. Since before transmitting a pilot signal, the base station acquires a spatial isolation between itself and its neighboring base station and detects specific an azimuth of a neighboring base station of which the spatial isolation exceeds an isolation threshold, this favors the base station to find an appropriate position or transmission/reception directions, thus avoiding interactive interference between the base station and its neighboring base station.

3. When transmitting data information to a base station, the user terminal adjusts its own transmission power not only taking into account a requirement of a base station to which the user terminal is attributed but also according to an interference threshold of a neighboring base station of the base station, if a first transmission power of the user terminal has too much interference on its neighboring base station, the transmission power of the user terminal per se will be lowered to reduce the interference on the neighboring base station, this solves the technical problem in the prior art that the interference is too high, and the neighboring base station is enabled to better receive data information transmitted from its terminal, thereby improving quality of uplink communications between the neighboring base station and its terminal.

4. Beam forming techniques are used in the embodiment of the present disclosure, since a beam forming gain enables a user terminal to receive a high power data signal weighted by multiple same phases, thus the traffic is improved, on the other hand, the base station can transmit data signals at relatively low transmission power due to the beam forming gain, thus being able to saving electricity; due to a reception combination gain of the beam forming techniques, the base station can receive data signals having better quality, thus the user terminal can transmit data signals to the base station at a lower power, thus further reducing data interference.

What described are merely preferable embodiments of the present disclosure, and are not intended to limit the present disclosure. All modifications, replacements and improvements made within the spirit and scope of the present disclosure should be included within the scope of protection of the present disclosure.

INDUSTRIAL APPLICABILITY

In the embodiment of the present disclosure, when transmitting data information to a user terminal, through determining a first transmission power, a base station acquires a strength of data interference of the base station on a terminal attributed to its neighboring base station when the data information is transmitted at the first transmission power, if the strength of the data interference exceeds an interference threshold, a practical transmission power of the base station is adjusted using beam-forming techniques so as to reduce the strength of the interference, thus solving the technical problem in the prior art that the base station has too excessive interference on the terminal attributed to its neighboring base station.

The invention claimed is:

1. A power control method of a base station for use in the base station, when the base station transmits data information to a user terminal, the method comprising:
   acquiring a first transmission power at which the data information is transmitted to the user terminal;
   determining, based on the first transmission power, a first strength of data interference on a terminal attributed to a neighboring base station;
   determining whether a difference value between the first strength of the data interference and an interference threshold is larger than 0 to acquire a determination result; and
   when the determination result is larger than 0, lowering the first transmission power to a second transmission power so that when the data information is transmitted at the second transmission power, a second strength of the data interference on the terminal attributed to the neighboring base station does not exceed the interference threshold;
   wherein the step of determining, based on the first transmission power, a first strength of data interference on a terminal attributed to a neighboring base station comprises:
   acquiring a first azimuth of beam forming between the base station and the user terminal and a second azimuth between the base station and the terminal attributed to the neighboring base station;
   acquiring, based on the first azimuth and the second azimuth, a third azimuth of the terminal attributed to the neighboring base station, deviating from a direction of the beam forming;
   acquiring, according to an azimuth radiation pattern of the beam forming, a first radiation loss in the third azimuth; and
   acquiring, based on the first transmission power and the first radiation loss, the first strength of the data interference on the terminal attributed to the neighboring base station when the data information is transmitted at the first transmission power.

2. The method according to claim 1, before the step of acquiring a first transmission power at which the data information is transmitted to the user terminal, the method further comprising:
acquiring a third transmission power of a first pilot signal;
transmitting the first pilot signal at the third transmission power to the user terminal; and
receiving a feedback signal transmitted from the user terminal in response to the first pilot signal, wherein the feedback signal can be used to acquire the first transmission power.

3. The method according to claim 2, wherein the step of acquiring a third transmission power of a first pilot signal comprises:
acquiring at least one spatial isolation between the base station and the neighboring base station;
determining whether a first spatial isolation, which is the minimum one of the at least one spatial isolation, is larger than an isolation threshold to acquire a second determination result; and
when the second determination result is Yes, acquiring, based on the first spatial isolation, the third transmission power of the first pilot signal.

4. The method according to claim 2, before the step of lowering the first transmission power to a second transmission power, the method further comprising:
acquiring, based on the feedback signal, parameter information for determining the second transmission power; and
determining, based on the parameter information and the difference value, the second transmission power at which the data information is transmitted to the user terminal.

5. The method according to claim 4, wherein the parameter information comprises:
a beam forming gain when signals are transmitted,
a noise floor of data information to be received by the user terminal,
a first spatial loss when the data information is transmitted to the user terminal, and
a demodulation threshold of a highest order modulation when the data information is transmitted to the user terminal.

6. The method according to claim 1, wherein the step of determining, based on the first transmission power, a first strength of data interference on a terminal attributed to a neighboring base station comprises:
transmitting a probe signal at the first transmission power; and
receiving the first strength of the data interference, on the terminal attributed to the neighboring base station, transmitted based on the probe signal from a core network to which the base station is attributed.

7. A power control method of a terminal for use in the terminal, when the terminal transmits data information to an operative base station, the method comprising:
receiving access signal strength information transmitted from the operative base station;
acquiring a first spatial loss when the data information is transmitted to the operative base station;
determining, based on the first spatial loss and an access signal strength in the access signal strength information, a first transmission power at which the data information is transmitted to the operative base station;
acquiring a second spatial isolation between the terminal and a neighboring base station of the operative base station;
acquiring, according to the second spatial isolation and the first transmission power, a strength of data interference on the neighboring base station;
determining whether a difference value between the strength of the data interference and an interference threshold is larger than 0 to acquire a determination result; and
when the determination result is larger than 0, lowering the first transmission power to a second transmission power so that when the data information is transmitted at the second transmission power, a second strength of the data interference on the neighboring base station does not exceed the interference threshold;
wherein before the lowering the first transmission power to a second transmission power, the method further comprising:
acquiring a reception combination gain when the operative base station receives data signals; and
determining, based on the reception combination gain, the difference value and the first transmission power, the second transmission power at which the data information is transmitted to the operative base station.

8. The method according to claim 7, wherein the step of acquiring a second spatial isolation between the terminal and a neighboring base station of the operative base station comprises:
listening to a third pilot signal power of the neighboring base station;
receiving a practical pilot signal transmission power, of the neighboring base station, acquired by the operative base station; and
acquiring, based on the third pilot signal power and the practical pilot signal transmission power, the second spatial isolation between the terminal and the neighboring base station.

9. A base station, comprising:
a first transmission unit configured to transmit a first pilot signal to a user terminal;
a first reception unit configured to receive a feedback signal transmitted from the user terminal in response to the first pilot signal; and
a first processing chip, connected with the first transmission unit and the first reception unit, configured to: acquire, based on the first pilot signal and the feedback signal, a noise floor of data information to be received by the user terminal and a first spatial loss when the data information is transmitted to the user terminal; determine, based on the noise floor and the first spatial loss, a first transmission power at which the data information is transmitted to the user terminal; determine, based on the first transmission power, a first strength of data interference on a terminal attributed to a neighboring base station; determine whether a difference value between the first strength of the data interference and an interference threshold is larger than 0 to acquire a determination result; and when the determination result is larger than 0, lower the first transmission power to a second transmission power so that when the data information is transmitted at the second transmission power, a second strength of the data interference on the terminal attributed to the neighboring base station does not exceed the interference threshold;

wherein the first processing chip is further configured to acquire a first azimuth of beam forming between the base station and the user terminal and a second azimuth between the base station and the terminal attributed to the neighboring base station; acquire, based on the first azimuth and the second azimuth, a third azimuth of the terminal attributed to the neighboring base station, deviating from a direction of the beam forming; acquire, according to an azimuth radiation pattern of the beam forming, a first radiation loss in the third azimuth; and acquire, based on the first transmission power and the first radiation loss, the first strength of the data interference on the terminal attributed to the neighboring base station when the data information is transmitted at the first transmission power.

10. A user terminal, comprising:

a second reception unit configured to receive access signal strength information transmitted from an operative base station and a first spatial loss when data information is transmitted to the operative base station;

a second processing chip, connected with the second reception unit, configured to: determine, according to the first spatial loss and a access signal strength in the access signal strength information, a first transmission power at which the data information is transmitted to the operative base station; acquire, according to a third spatial isolation between the user terminal and a neighboring base station of the operative base station and the first transmission power, a strength of data interference on the neighboring base station of the operative base station; determine whether a difference value between the strength of the data interference and an interference threshold is larger than 0 to acquire a determination result; and when the determination result is larger than 0, lower the first transmission power to a second transmission power so that when the data information is transmitted at the second transmission power, a second strength of the data interference on the neighboring base station of the operative base station does not exceed the interference threshold; and a second transmission unit, connected with the second processing chip, configured to transmit the data information to the operative base station at the second transmission power;

wherein the second processing chip is further configured to acquire a reception combination gain when the operative base station receives data signals; and determine, based on the reception combination gain, the difference value and the first transmission power, the second transmission power at which the data information is transmitted to the operative base station before lowering the first transmission power to the second transmission power.

* * * * *